United States Patent
Herng-Chuen

[11] Patent Number: 5,914,703
[45] Date of Patent: Jun. 22, 1999

[54] CURSOR CONTROL DEVICE

[75] Inventor: Ho Herng-Chuen, Taipei, Taiwan

[73] Assignee: Primax Electronics. Ltd., Taiwan

[21] Appl. No.: 08/852,885

[22] Filed: May 8, 1997

[51] Int. Cl.[6] .................................................. G09G 5/08
[52] U.S. Cl. ........................ 345/157; 345/167; 345/169
[58] Field of Search ................................. 345/156, 157, 345/167, 169, 184

[56] References Cited

U.S. PATENT DOCUMENTS

| | | | |
|---|---|---|---|
| 5,019,809 | 5/1991 | Chen | 345/163 |
| 5,049,863 | 9/1991 | Oka | 345/163 |
| 5,075,792 | 12/1991 | Brown et al. | 359/152 |
| 5,095,303 | 3/1992 | Clark et al. | 345/164 |
| 5,323,203 | 6/1994 | Maruyama et al. | 354/410 |
| 5,347,646 | 9/1994 | Hirosawa et al. | 395/575 |
| 5,383,043 | 1/1995 | Su | 359/142 |
| 5,414,761 | 5/1995 | Darbee | 379/102 |
| 5,541,414 | 7/1996 | Hori | 250/349 |
| 5,563,631 | 10/1996 | Masunaga | 345/163 |

*Primary Examiner*—Matthew Luu
*Attorney, Agent, or Firm*—Winston Hsu

[57] ABSTRACT

A cursor control device electrically connected to a computer is used for controlling movements of an object within a three-dimensional image displayed over a screen of the computer. The computer comprises a computer program for controlling display of the three-dimensional image over the screen and for moving the object within the three-dimensional image. The three-dimensional image comprises a first, a second and a third coordinates mutually perpendicular to each other. The cursor control device comprises a housing having a first panel and a second panel perpendicular to each other, a first cursor controller installed on the first panel for generating a first two-dimensional signal, and a second cursor controller installed on the second panel for generating a second two-dimensional signal. The computer program moves the object within a two-dimensional plane formed by the first and second coordinates within the three-dimensional image according to the first two-dimensional signal and moves the object within a two-dimensional plane formed by the second and third coordinates within the three-dimensional image according to the second two-dimensional signal.

10 Claims, 3 Drawing Sheets

CURSOR CONTROL DEVICE

BACKGROUND OF THE INVENTION

1. Field of the Invention

The present invention is a cursor control device, and more particularly, a cursor control device for controlling movements of an object within a three-dimensional image displayed over a screen of the computer.

2. Description of the Prior Art

Most cursor control devices such as track ball or touch pad used in portable computers are only suitable for controlling movements of an object within a two-dimensional image. For those computer applications such as TV games which require three dimensional movement control capability, joysticks are usually the primary choice. But most joysticks are very bulky and complex in shape. It makes them difficult to be packed and carried along with a portable computer. This is the reason why most portable computer users have to use two dimensional cursor control devices to control three dimensional movements in three dimensional applications. Such control operations are usually quite complex and inefficient in making three dimensional movement control.

SUMMARY OF THE INVENTION

It is therefore a primary objective of the present invention to provide a cursor control device which is very compact in size and easy to use for controlling movements of an object within a three-dimensional image.

Briefly, in a preferred embodiment, the present invention includes a cursor control device electrically connected to a computer for controlling movements of an object within a three-dimensional image displayed over a screen of the computer. The computer comprises a computer program for controlling display of the three-dimensional image over the screen and for moving the object within the three-dimensional image. The three-dimensional image comprises a first, a second and a third coordinates mutually perpendicular to each other. The cursor control device comprises:

(1) a housing having a horizontal panel and a vertical panel;
(2) a first cursor controller installed on the horizontal panel of the housing for generating a first two dimensional signal; and
(3) a second cursor controller installed on the vertical panel of the housing for generating a second two dimensional signal.

The computer program moves the object within a two-dimensional plane formed by the first and second coordinates within the three-dimensional image according to the first two-dimensional signal and moves the object within a two-dimensional plane formed by the second and third coordinates within the three-dimensional image according to the second two-dimensional signal. The first and second cursor controllers can be operated simultaneously by using thumb and index fingers or thumb and middle fingers of a hand.

It is an advantage of the present invention that the cursor control device is very compact in size which can be easily coupled to a portable computer.

It is another advantage of the present invention that the cursor control device is very easy to use for controlling movements of an object within a three-dimensional image.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
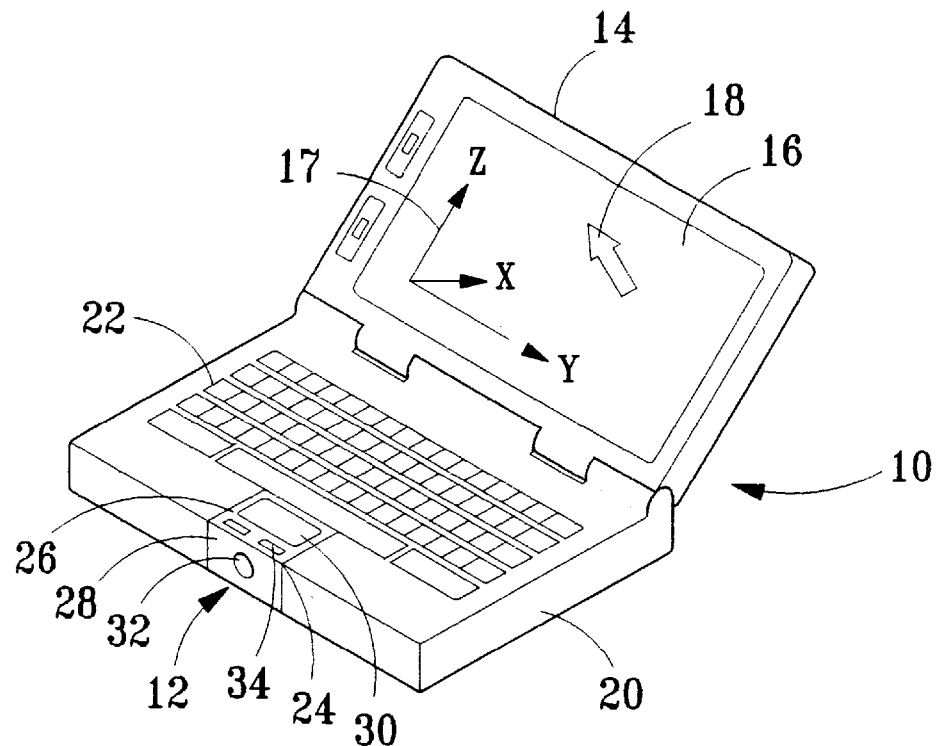
FIG. 1 is a perspective view of a cursor control device installed in a portable computer according to the present invention.

FIG. 1 is a perspective view of a cursor control device 12 installed in a portable computer 10 according to the present invention. Computer 10 comprises a monitor 14 having a screen 16 for displaying a cursor 18 and a three-dimensional image 17, and a rectangular computer housing 20 pivotally installed under the monitor 14. The housing 20 comprises a keyboard 22 on its upper end and a cursor control device 12 installed on the center of its front end. The cursor control device 12 is used for controlling movements of the cursor 18 within the three-dimensional image 17.

Cursor control device 12 comprises an approximately right angle housing 24 having a horizontal panel 26 and vertical panel 28, a horizontal cursor controller 30 installed on the horizontal panel 26 for generating a first movement signal, a vertical cursor controller 32 installed on the vertical plane 28 for generating a second movement signal, and two push buttons 34. In this embodiment, the horizontal cursor controller 30 is a touch pad, and the vertical cursor controller 32 is a track ball. Both devices are used to generate two-dimensional movement signals for controlling movements of the cursor 18. Various cursor control devices can be installed to the horizontal panel 26 and vertical plane 28 based on different requirements.

The arrangement of the locations of the horizontal cursor controller 30 and the vertical cursor controllers 32 make them easy to be operated by using thumb and index fingers or thumb and middle fingers of a hand simultaneously. And the cursor control device 12 is installed on the center of the front end of the computer housing 20 so that it can be operated by using either left or right hand. A user can thus use two fingers to control movements of the cursor 18 inside of the image 17.

The three dimensions of the image 17 can be represented by using X, Y, and Z coordinates which are mutually perpendicular to each other. An X-Y horizontal plane which is perpendicular to the screen 16 is formed by the X and Y coordinates. A Y-Z vertical plane which is parallel to the screen 16 is formed by the Y and Z coordinates. The two-dimensional movement signals generated by the horizontal cursor controller 30 are used for controlling movements of the cursor 18 over the X-Y horizontal plane. And the two-dimensional movement signals generated by the vertical cursor controller 32 are used for controlling movements of the cursor 18 on the Y-Z vertical plane.

The consistency between the horizontal panel 26 and vertical panel 28 of the cursor control device 12 and the X-Y horizontal plane and Y-Z vertical plane of the three-dimensional image 17 makes the cursor control device 12 very easy to control three-dimensional movements over three-dimensional applications. A user can intuitively use the horizontal cursor controller 30 located on the horizontal panel 26 to control movements of the cursor 18 on the X-Y horizontal plane, and use the vertical cursor controller 32 located on the vertical plane 28 to control movements of the cursor 18 on the Y-Z vertical plane. Such three-dimensional consistency between the cursor control device 12 and the three-dimensional image 17 has never been seen in traditional cursor control devices. And using two-dimensional movements over the X-Y horizontal plane and the Y-Z vertical plane separately to achieve three-dimensional movement controls makes it very easy to use two two-dimensional cursor controllers to control three-dimensional operations.

Figure 2:
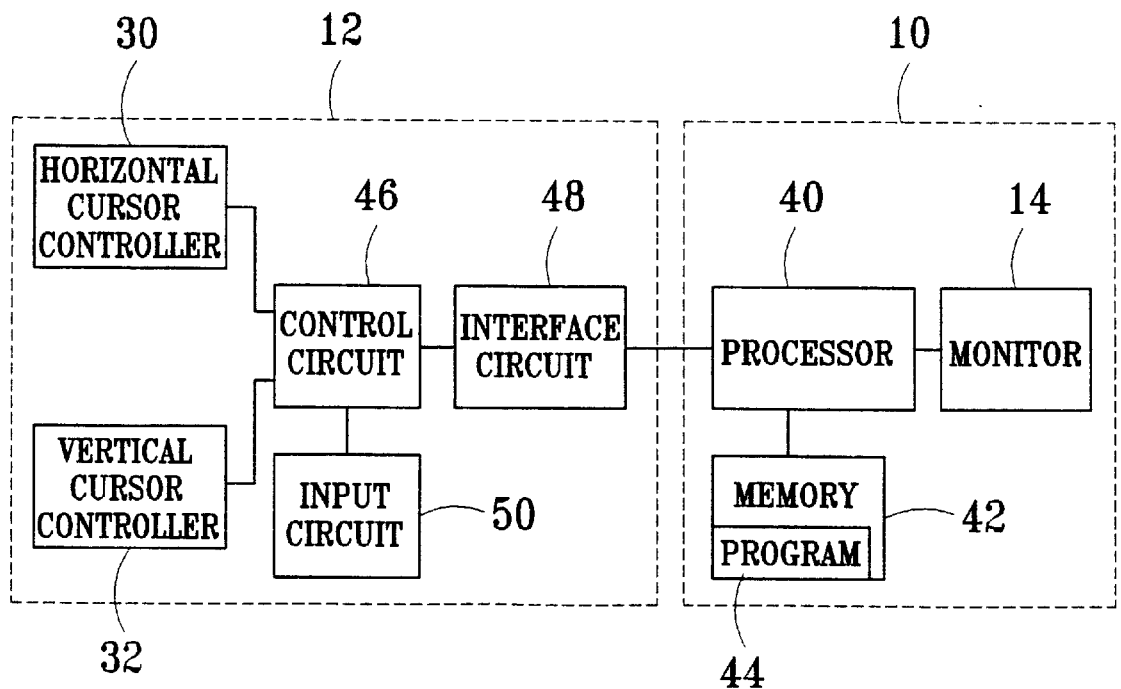
FIG. 2 is a block diagram of the cursor control device and the portable computer shown in FIG. 1.

FIG. 2 is a block diagram of the cursor control device 12 and the portable computer 10 shown in FIG. 1. Computer 10 comprises a memory 42 for storing computer programs and a processor 40 for executing programs stored in the memory. A computer program 44 is stored in the memory 42 which is used for displaying the three-dimensional image 17 over the monitor 14 and for controlling movements of cursor 18 in the image 17 according to the movement signals generated by the cursor control device 12. The cursor control device 12 is electrically connected to the computer 10 for generating movement signals. It includes a horizontal cursor controller 30 which is a touch pad for generating two-dimensional movement signals, a vertical cursor controller 32 which is a track ball for generating two-dimensional movement signals, an input circuit 50 which connects to the push buttons 34 for generating button signals, and a control circuit 46 for transferring all the signals generated by the cursor control device 12 to computer 10 through an interface circuit 48.

When the program 44 executed in the computer 10 receives a movement signal from the cursor control device 12, it will move the cursor 18 within the image 17 according to the received movement signal. The two-dimensional movement signal generated by the horizontal cursor controller 30 will first be converted into a two-dimensional vector by the program 44. And then the cursor 18 will be moved along an X-Y horizontal plane formed by the X and Y coordinates over which the cursor 18 is located according to the two-dimensional vector. By the same token, the two-dimensional movement signal generated by the vertical cursor controller 32 will also be converted into a two-dimensional vector by the program 44 and the cursor 18 will be moved along an Y-Z vertical plane formed by the Y and Z coordinates over which the cursor 18 is located according to the two-dimensional vector.

The cursor 18 can be moved by using both the horizontal cursor controller 30 and the vertical cursor controller 32 along the Y coordinate within the image 17. If a user actuates the horizontal cursor controller 30 and the vertical cursor controller 32 simultaneously, two correspondent Y vectors along the Y coordinate can be generated at the same time. Two different methods can be used by the program 44 to handle such situation. The first method is to sum up these two Y vectors and move the cursor 18 accordingly. This method may cause the cursor 18 move faster along the Y coordinate than along the other two coordinates. Another method is to select the Y vector generated one predetermined cursor controller such as the horizontal cursor controller 30 when the Y vectors generated by both cursor controller 30 and 32 are presented. This method will make the moving speed of the cursor 18 along the Y coordinate the same as the other two coordinates.

In some cases, if the two cursor controllers 30 and 32 can not be installed over two mutually perpendicular panels such as the horizontal panel 26 and vertical panel 28, the two cursor controllers 30 and 32 can be installed on a flat panel. For example, two horizontal cursor controllers 30 can be installed in parallel in the horizontal panel 26 so that a user can use index and middle fingers to operate the two cursor controllers 30 and 32 to move the cursor 18 along X-Y horizontal plane or Y-Z vertical plane over which the cursor 18 is located.

Figure 3:
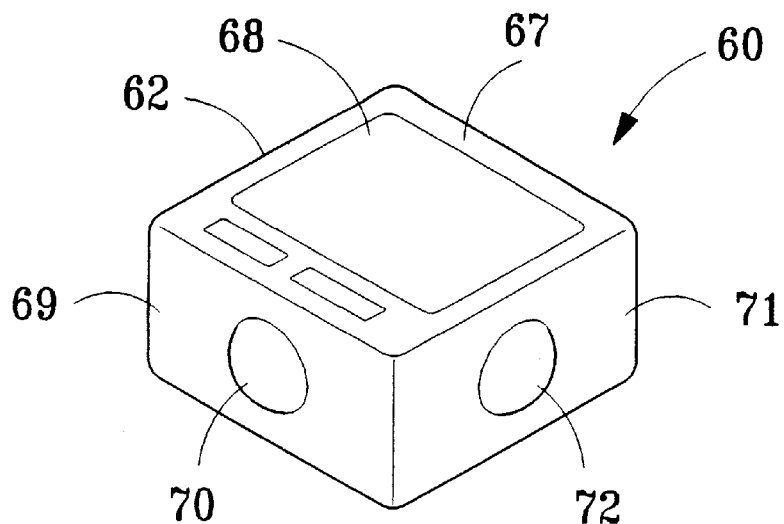
FIG. 3 shows an alternative cursor control device according to the present invention.

FIG. 3 shows an alternative cursor control device 60 according to the present invention. Cursor control device 60 comprises a housing 62 having 3 mutually perpendicular panels: horizontal panel 67, vertical panel 69, and lateral panel 71, a horizontal cursor controller 68 which is a touch pad installed on the horizontal panel 67, a vertical cursor controller 70 which is a track ball installed on the vertical panel 69, and a lateral cursor controller 72 which is also a track ball installed on the lateral panel 71. The horizontal cursor controller 68 is used for controlling movements of the cursor 18 along an X-Y horizontal plane where the cursor 18 is located. The vertical cursor controller 70 is used for controlling movements of the cursor 18 along a Y-Z vertical plane where the cursor 18 is located. And the lateral cursor controller 72 is used for controlling movements of the cursor 18 along an X-Z lateral plane where the cursor 18 is located.

Comparing with the cursor control device 12 shown in FIG. 1, the cursor control device 60 shown in FIG. 3 has an extra two-dimensional cursor controller 72 for controlling movements of the cursor 18 along the X-Z lateral plane. Such design greatly simplifies the movement control of the cursor 18 along the X-Z lateral plane.

The three cursor controllers 68, 70 and 72 can also be installed on a flat panel if it is impossible to put these three controllers on three mutually perpendicular panels. In such case, a user can use index finger, middle finger, and ring finger to operate the three controllers for controlling cursor movements along the X-Y horizontal plane, Y-Z vertical plane and X-Z lateral plane over which the cursor 18 is located.

Figure 4:
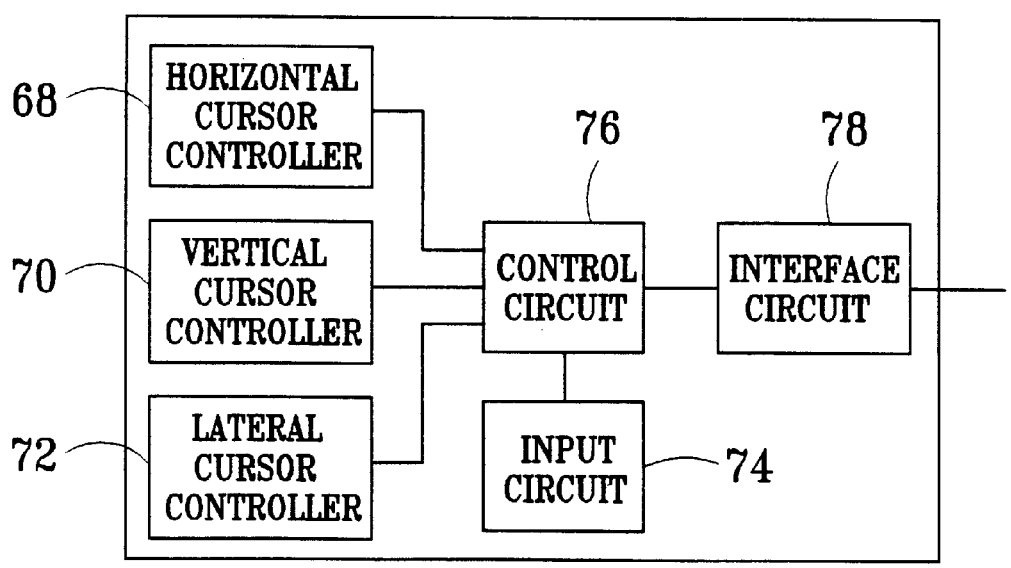
FIG. 4 is a block diagram of the cursor control device shown in FIG. 3.

FIG. 4 is a block diagram of the cursor control device 60 shown in FIG. 3. The cursor control device 60 comprises a horizontal cursor controller 68, a vertical cursor controller 70 and a lateral cursor controller 72 for generating two-dimensional movement signals, an input circuit 74 connected to the push buttons of the cursor control device 60 for generating button signals, and a control circuit 76 for transferring all the signals generated by the cursor control device 60 to the computer 10 through the interface circuit 78. Comparing with the block diagram of the cursor control device 12 shown in FIG. 2, the cursor control device 60 comprises one extra two-dimensional lateral cursor controller 72.

Figure 5:
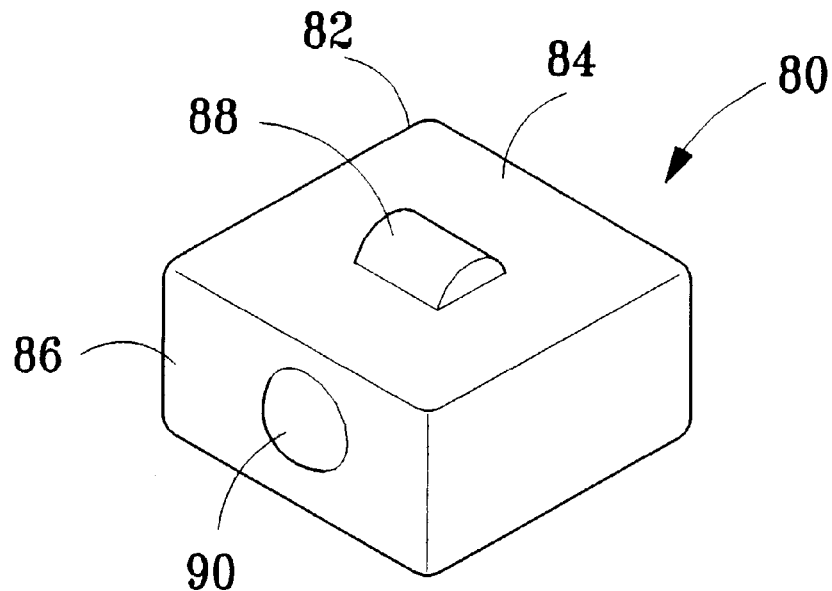
FIG. 5 shows another cursor control device according to the present invention.

FIG. 5 shows another cursor control device 80 according to the present invention. The cursor control device 80 comprises a housing 82 having two mutually perpendicular panels: horizontal panel 84 and vertical panel 86, a horizontal cursor controller 88 which is a rotatable wheel installed on the horizontal panel 84, a vertical cursor controller 90 which is a track ball installed on the vertical panel 86. The horizontal cursor controller 88 is used for controlling movements of the cursor 18 along the X coordinate over which the cursor 18 is located. And the vertical cursor controller 90 is used for controlling movements of the cursor 18 along the Y-Z vertical plane over which the cursor 18 is located. The rotatable wheel 88 can be replaced by other devices such as a slidable button for driving the cursor 18 back and forth along the X coordinate.

Comparing with the cursor control device 12 shown in FIG. 1, the rotatable wheel 88 of the cursor control device 80 can only perform one-dimensional cursor movement control. The electrical circuit of the cursor control device 80 is very similar to the cursor control device 12 except that the horizontal cursor controller 88 can only generate one-dimensional movement signals.

Figure 6:
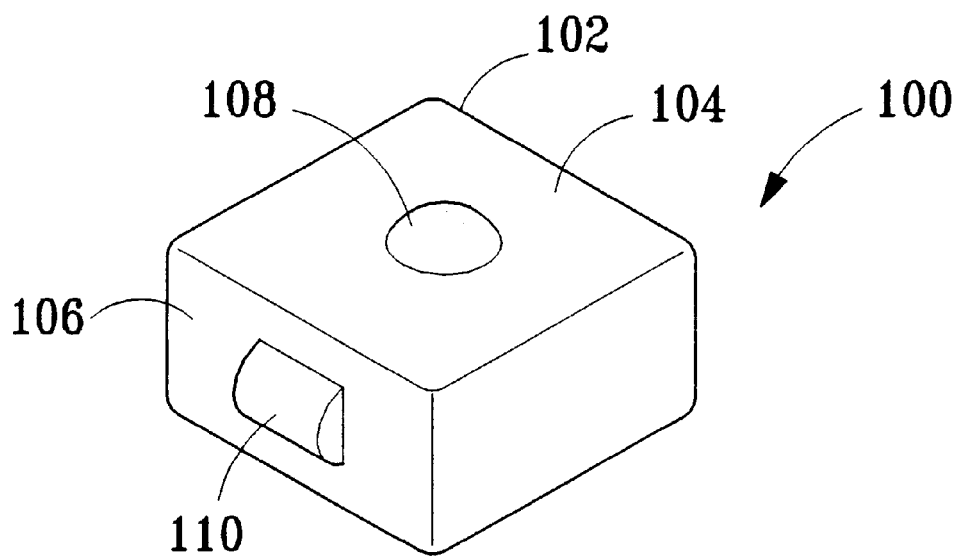
FIG. 6 is a variation of the cursor control device shown in FIG. 5.

FIG. 6 is a variation of the cursor control device 80 shown in FIG. 5. The cursor control device 100 comprises a housing 102 having two mutually perpendicular panels: horizontal panel 104 and vertical panel 106, a horizontal cursor controller 108 which is a track ball installed on the horizontal panel 104, and a vertical cursor controller 110 which is a rotatable wheel installed on the vertical panel 106. The horizontal cursor controller 108 is used for controlling movements of the cursor along the X-Y horizontal plane over which the cursor 18 is located. And the vertical cursor controller 110 is used for controlling movements of the cursor along the Z coordinate over which the cursor 18 is located.

Comparing with the cursor control device 80 shown in FIG. 5, the positions of the one-dimensional horizontal cursor controller 88 and the two-dimensional vertical cursor controller 90 of the cursor control device 80 are reversed in the cursor control device 100. The right angle relation between the horizontal panel 104 and vertical panel 106 makes it very easy for a user to make three dimensional movement controls by using the two controllers 108 and 110. And comparing with traditional joysticks, the cursor control devices 12, 60, 80 and 100 are all very compact and can easily be integrated into portable computers or built as a small peripheral device which can be easily carried with other equipments.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cursor control device electrically connected to a computer for controlling movements of an object within a three-dimensional image displayed over a screen of the computer, the computer comprising a computer program for controlling display of the three-dimensional image over the screen and for moving the object within the three-dimensional image, the three-dimensional image comprising a first, a second and a third coordinates mutually perpendicular to each other, the cursor control device comprising:
   a. a housing having a first panel and a second panel, said two panels being approximately perpendicular to each other;
   b. a first cursor controller installed on the first panel for generating a first two-dimensional movement signal; and
   c. a second cursor controller installed on the second panel for generating a second two-dimensional movement signal;
   wherein the computer program moves the object within a two-dimensional plane formed by the first and the second coordinates within the three-dimensional image according to the two-dimensional movement signal generated by the first cursor controller, and the computer program moves the object within a two-dimensional plan formed by the second, and the third coordinates within the three-dimensional image according to the two-dimensional signal generated by the second cursor controller.

2. The cursor control device of claim 1 wherein each of the first and the second cursor controllers can be a track ball or a touch pad for generating two-dimensional signals.

3. The cursor control device of claim 1 herein one of the two panels of the cursor control device is a horizontal panel, and the other is a vertical panel.

4. The cursor control device of claim 3 wherein the three-dimensional image comprises a horizontal plane which is formed by the first and second coordinates and is perpendicular to the screen, and a vertical plane which is formed by the second and third coordinates and is parallel to the screen, and wherein the computer program moves the object within the horizontal plane according to the two-dimensional signal generated by the cursor controller installed on the horizontal panel, and moves the object within the vertical plane according to the two-dimensional signal generated by the cursor controller installed on the vertical panel.

5. The cursor control device of claim 1 wherein the computer program combines the first and second movement signals generated by the cursor control device within a predetermined period to form a combined movement signal and moves the object within the three-dimensional image according to the combined movement signal.

6. The cursor control device of claim 1 wherein the first and second cursor controllers can be operated simultaneously by using thumb and index fingers or thumb and middle fingers of a hand.

7. The cursor control device of claim 1 wherein the computer is a portable computer having a front end, and wherein the housing of the cursor control device is installed in the front end of the portable computer.

8. The cursor control device of claim 1 wherein the housing comprises a third panel perpendicular to the first and second panels and the cursor control device further comprises a third cursor controller installed on the third panel for generating a third two-dimensional movement signal, and wherein the computer program moves the object within a two-dimensional plane formed by the first and the third coordinates within the three-dimensional image according to the two-dimensional signal generated by the third cursor controller.

9. A cursor control device electrically connected to a computer for controlling movements of an object within a three-dimensional image displayed over a screen of the computer, the computer comprising a computer program for controlling display of the three-dimensional image over the screen and for moving the object within the three-dimensional image, the three-dimensional image comprising a first, a second and a third coordinates mutually perpendicular to each other, the cursor control device comprising:
   a. a housing;
   b. a first cursor controller installed on the housing for generating a first two dimensional signal; and
   c. a second cursor controller installed on the housing for generating a second two dimensional signal;
   wherein the computer program moves the object within a two-dimensional plane formed by the first and second coordinates within the three-dimensional image according to the first two-dimensional signal and moves the object within a two-dimensional plane formed by the second and third coordinates within the three-dimensional image according to the second two-dimensional signal.

10. The cursor control device of claim 9 further comprising a third cursor controller installed on the housing for generating a third two dimensional signal wherein the computer program moves the object within a two-dimensional plane formed by the first and third coordinates within the three-dimensional image according to the third two-dimensional signal.

* * * * *